(12) United States Patent
Lu et al.

(10) Patent No.: US 12,391,392 B1
(45) Date of Patent: Aug. 19, 2025

(54) MASTER-SLAVE HYBRID-ELECTRIC POWERTRAIN CONTROL ARCHITECTURE WITH SUPERVISORY POWER MANAGEMENT CONTROL

(71) Applicant: Pratt & Whitney Canada Corp., Longueuil (CA)

(72) Inventors: Xuening Lu, Oakville (CA); Poi Loon Tang, Coquitlam (CA); Richard Freer, Mont-Sainte-Hilaire (CA); Louis-Philippe Larose, St-Sabine (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/977,403

(22) Filed: Dec. 11, 2024

(51) Int. Cl.
*B64D 31/09* (2024.01)
*B64D 31/18* (2024.01)

(52) U.S. Cl.
CPC ............ *B64D 31/18* (2024.01); *B64D 31/09* (2024.01)

(58) Field of Classification Search
CPC ........ B64D 31/18; B64D 31/09; B64D 31/16; B64D 31/00; B64D 31/02; B64D 31/06; B64D 27/30; B64D 27/33; B64D 27/35; B64D 27/02; B64D 27/10; F02K 5/00; F05D 2220/323; F05D 2270/052
See application file for complete search history.

(56) References Cited

U.S. PATENT DOCUMENTS

| | | | |
|---|---|---|---|
| 9,505,298 B2 * | 11/2016 | Fraser | B60W 20/10 |
| 11,015,480 B2 * | 5/2021 | Waun | B60L 50/10 |
| 11,428,171 B2 * | 8/2022 | Brown | F02C 9/28 |
| 11,866,180 B2 | 1/2024 | Long | |
| 12,006,052 B2 | 6/2024 | Prabhakaran et al. | |
| 12,031,479 B2 | 7/2024 | Hiett et al. | |
| 2021/0388733 A1 * | 12/2021 | Valois | F01D 15/10 |
| 2022/0065163 A1 * | 3/2022 | Rambo | B64D 41/00 |
| 2023/0257128 A1 * | 8/2023 | Freer | B64D 27/357 244/55 |
| 2024/0092497 A1 * | 3/2024 | Thiriet | B64C 27/12 |
| 2024/0175397 A1 * | 5/2024 | Tunzini | F02C 7/268 |
| 2024/0367807 A1 * | 11/2024 | Freer | B64D 27/02 |
| 2024/0375766 A1 | 11/2024 | Freer | |

* cited by examiner

*Primary Examiner* — Dapinder Singh

(57) ABSTRACT

A method of operating a hybrid electric powertrain (HEP) may include determining, based on a HEP torque demand and a maximum torque limit for a gas turbine engine having a mechanical output coupled to a power shaft of the HEP, a target torque for the gas turbine engine. The method may also include controlling the gas turbine engine to operate according to a target speed or the target torque. The method may also include, while operating the gas turbine engine according to the target speed or the target torque, determining, based on the HEP torque demand and the target torque, a total torque compensation demand for an electric machine having a mechanical output controllably couplable to the power shaft of the HEP, and operating the electric machine according to the total torque compensation demand.

20 Claims, 2 Drawing Sheets

MASTER-SLAVE HYBRID-ELECTRIC POWERTRAIN CONTROL ARCHITECTURE WITH SUPERVISORY POWER MANAGEMENT CONTROL

TECHNICAL FIELD

This disclosure generally relates to hybrid electric powertrains. More specifically, this disclosure relates to master-slave hybrid-electric powertrain control architectures with supervisory power management control.

BACKGROUND

A hybrid electric powertrain (HEP) system includes multidisciplinary technologies of electrical (e.g., electrical motors/generators, energy storage system/distribution/charging system—batteries, charger/high voltage distribution unit etc.) and mechanical components (e.g., main rotor, propeller, etc.). Modern control system techniques and methodologies therefore plays important roles in HEP technology.

SUMMARY

This disclosure relates to master-slave hybrid-electric powertrain control architectures with supervisory power management control.

In some examples, a method of operating a hybrid electric powertrain (HEP) may include determining, based on a HEP power/torque demand and a maximum torque limit for a gas turbine engine having a mechanical output coupled to a power shaft of the HEP, a target torque for the gas turbine engine. The method may also include controlling the gas turbine engine to operate according to a target speed or the target torque. The method may also include, while operating the gas turbine engine according to the target speed or the target torque, determining, based on the HEP torque demand and the target torque, a total torque compensation demand for an electric machine having a mechanical output controllably couplable to the power shaft of the HEP, and operating the electric machine according to total the torque compensation demand. The total torque compensation demand may be determined as a sum of a steady state torque compensation demand and a dynamic torque compensation demand.

In other examples, a controller may be configured to determine, based on a HEP torque demand and a maximum torque limit for a gas turbine engine having a mechanical output coupled to a power shaft of the HEP, a target torque for the gas turbine engine. The controller may also be configured to control the gas turbine engine to operate according to a target speed or the target torque. The controller may also be configured to, while operating the gas turbine engine according to the target speed or the target torque, determine, based on the HEP torque demand and the target torque, a total torque compensation demand for an electric machine having a mechanical output controllably couplable to the power shaft of the HEP, and operate the electric machine according to the total torque compensation demand. The total torque compensation demand may be determined as a sum of a steady state torque compensation demand and a dynamic torque compensation demand.

In in still other examples, a non-transitory machine readable medium includes instructions that when executed cause at least one processor to determine, based on a HEP torque demand and a maximum torque demand for a gas turbine engine having a mechanical output coupled to a power shaft of the HEP, a target torque for the gas turbine engine. The instructions may also cause the at least one processor to control the gas turbine engine to operate according to a target speed or the target torque. The instructions may also cause the at least one processor to, while operating the gas turbine engine according to the target speed or the target torque, determine, based on the HEP torque demand and the target torque, a total torque compensation demand for an electric machine having a mechanical output controllably couplable to the power shaft of the HEP, and operate the electric machine according to the total torque compensation demand. The total torque compensation demand may be determined as a sum of a steady state torque compensation demand and a dynamic torque compensation demand.

Any single one or any combination of the following features may be used with the examples above. The controller may receive at least one control input, and the HEP torque demand may be determined based on the at least one control input. The steady state torque compensation demand may be determined based on a difference between the HEP torque demand and a steady state torque demand of the gas turbine engine. The dynamic torque compensation demand may be determined based on a closed loop control on a propulsor speed datum via an available HEP. Operating the electrical machine according to the total torque compensation demand may include controlling the mechanical output of the electric machine to couple to the power shaft of the HEP and supply a power boost. The total torque compensation demand may be determined to be a minimum for a speed synchronization. Operating the electrical machine according to the total torque compensation demand may include, based on the determination that the total torque compensation demand is the minimum, controlling the mechanical output of the electric machine to couple to the power shaft of the HEP but not supply a power boost. The total torque compensation demand may be determined to be none. Operating the electrical machine according to the total torque compensation demand may include, based on the determination that the total torque compensation demand is none, controlling the mechanical output of the electric machine to decouple from the power shaft of the HEP. The dynamic torque compensation demand may be a closed loop control on a propulsor speed datum via an available HEP speed sensor measurement. The HEP torque demand may be determined based on the at least one control input. The electric machine may include a plurality of electric motors. Operating the electric machine according to the total torque compensation demand may include detecting a failure of at least one of the electric motors, and allocating the total torque compensation demand among the electric motors that have not failed while limiting the total torque compensation demand to a level appropriate for a capability of the electric motors that have not failed.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
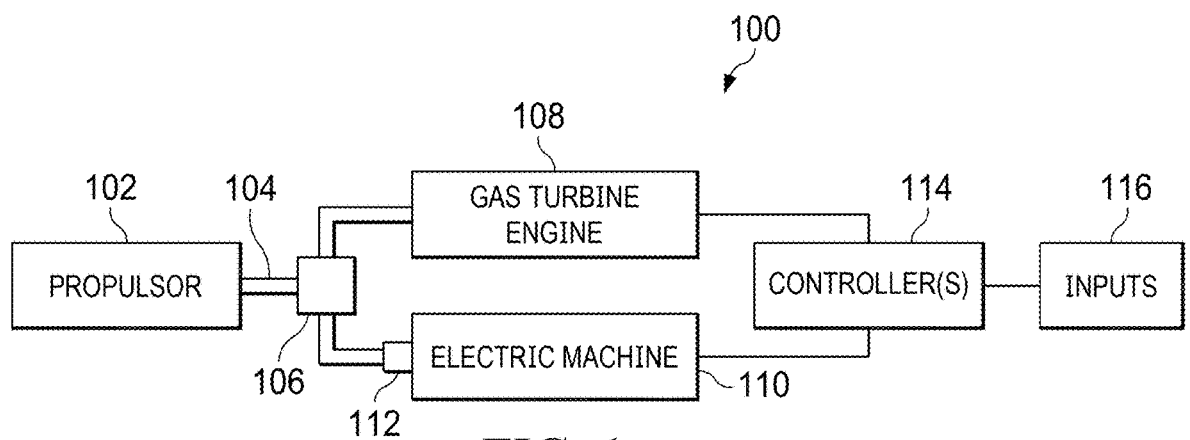
FIG. 1 illustrates a schematic view of a HEP system in accordance with this disclosure.
Figure 2:
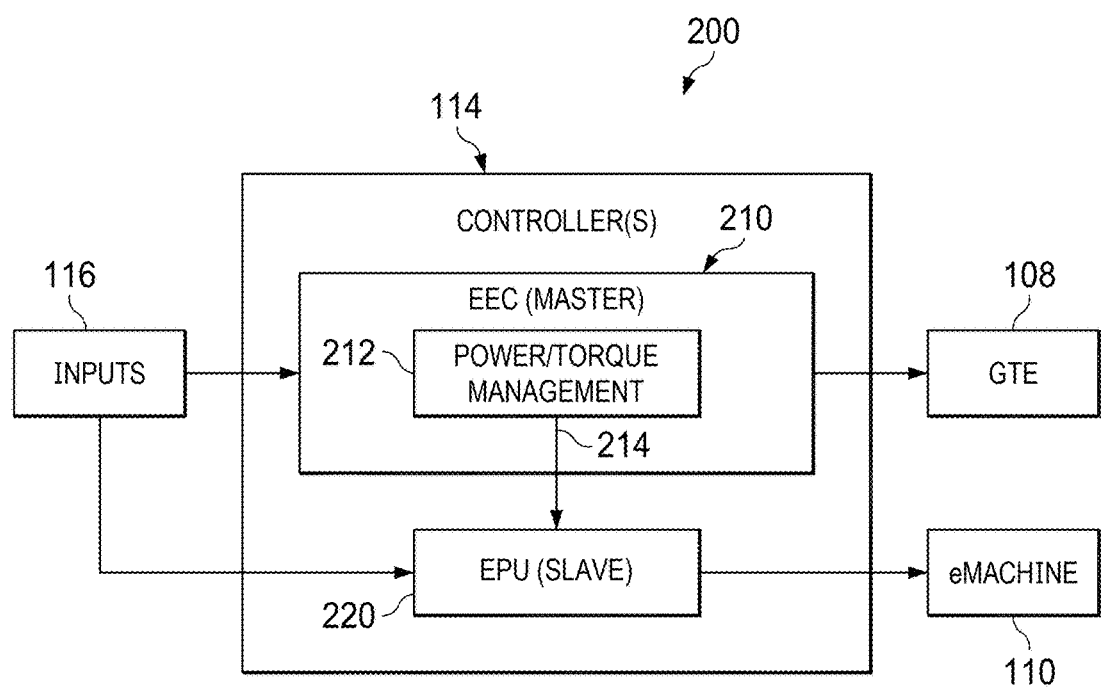
FIG. 2 illustrates a Master-Slave HEP engine control architecture in accordance with this disclosure.
Figure 3:
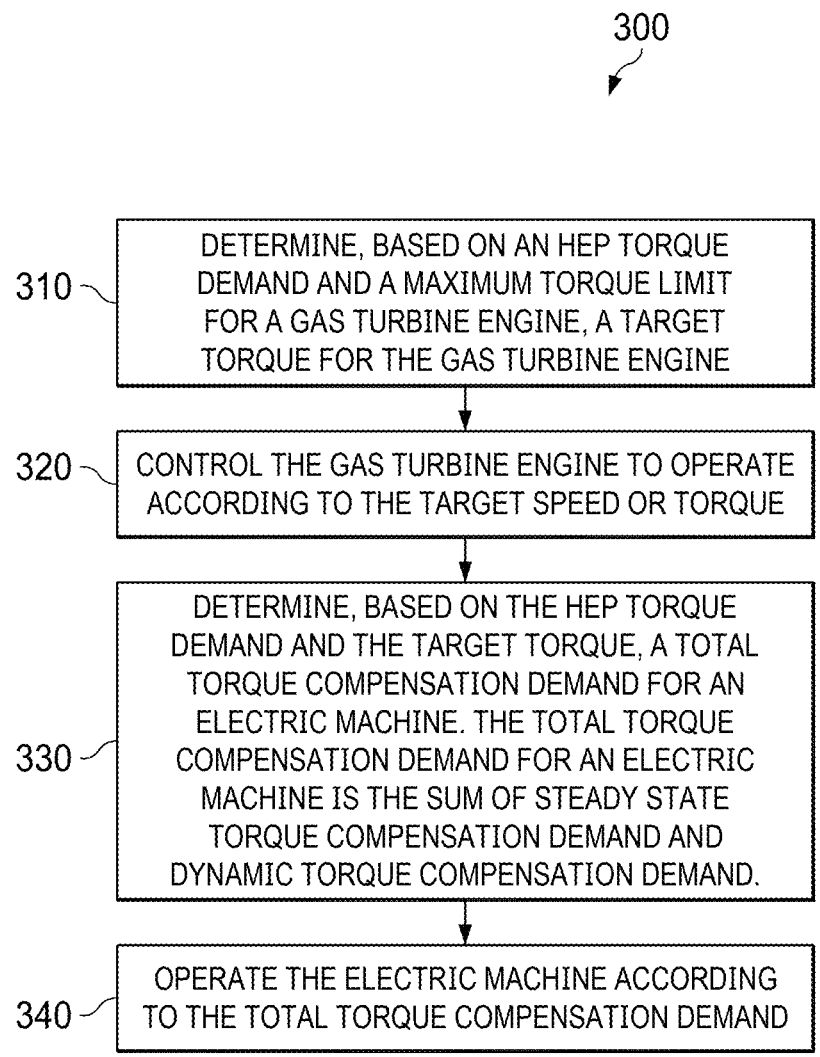
FIG. 3 illustrates a flowchart for an example method for a master-slave HEP control architecture with supervisory power management control in accordance with this disclosure.

FIGS. 1 through 3, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As stated above, a hybrid electric powertrain (HEP) system includes multidisciplinary technologies of electrical and mechanical components. FIG. 1 illustrates a schematic view of a HEP system 100 in accordance with this disclosure. In the example of FIG. 1, system 100 includes a propulsor 102. For example, propulsor 102 may be a propeller for a propeller driven aircraft, a main rotor for a helicopter, etc. Propulsor 102 receives power via a power shaft 104. Power shaft 104 is mechanically coupled to the mechanical output of a gas turbine engine 108 (e.g., an aero-turbo engine with free turbines) via a gearbox 106. Power shaft is also mechanically coupled to the mechanical output of an electric machine 110 (e.g., an electric motor or motor/generator). Electric machine 110 may include a coupling system 112 (e.g., a clutch) that may couple and decouple the mechanical output of electric machine 110. For example, coupling system 112 could be an overrunning clutch, a connecting/disconnecting clutch, etc. During operation of HEP system 100, gas turbine engine 108 and electric machine 110 are controlled via one or more controller(s) 114 based on feedback from inputs 116. For example, in some embodiments controller(s) 114 may be a separate electronic engine control (EEC) for controlling gas turbine engine 108, and a separate electric powertrain controller (EPU) for controlling electric machine 110. In other embodiments, controller(s) 114 may be a single controller that includes EEC and EPU functionality. In some embodiments, electric machine 110 may comprise multiple electric motors configured in a parallel configuration or in a serial configuration.

Although FIG. 1 illustrates one example of operation of a HEP system 100, various changes may be made to FIG. 1. For example, while FIG. 1 shows that the mechanical outputs of gas turbine engine 108 and electric machine 110 are mechanically coupled to power shaft 104 via gearbox 106, in some embodiments either or both outputs of gas turbine engine 108 and electric machine 110 may be directly coupled to power shaft 104, gas turbine engine 108 and electric machine 110 may be coupled via separate gearboxes, additional components (e.g., shafts, transmissions, etc.) etc.

Hybrid electric powertrain control problems are complicated and moreover, they are generally nonlinear, exhibit fast parameter variation, and operate under uncertain and/or changing conditions. To achieve the maximal fuel economy and meet emission standards within the aircraft operating envelope, a HEP system employs complex control strategies to meet the operability/safety requirements. The control challenges are associated not only with the thermal engine, the electric motor/converter and the energy storage system, but also with the energy management strategy determining how to split the aircraft's required power/torque between the combustion engine and the electric motor/generator.

Currently, the aviation industry is developing/prototyping hybrid electric powertrain control systems based on a distributed architecture in which, the thermal engine (i.e., jet turbine engine) electronic controller (EEC) and electric powertrain controller (EPU) are generally separated as two units and primary control functions and sensor feedback are communicated via serial communication (i.e. CAN or ARINC BUS). The Thermal engine/electric powertrain control strategy is generally a speed governing (e.g., turboshaft, turboprop and turbogenerator) with dynamic limiting controls with respect to thermal engine mechanical limits (e.g., torque) and thermal limits (e.g., ITT) and electrical powertrain mechanical limits (e.g., torque) and electrical limits (e.g., current).

The present disclosure provides various embodiments of a HEP control system architecture in the form of Master-Slave or Master-Follower type, where the concurrent speed control governing is removed to eliminate any potential limit cycling. Furthermore, various embodiments of the provided HEP control system architecture minimize the network delays caused by digital communication latency/transmission delays.

FIG. 2 illustrates a Master-Slave HEP engine control architecture 200 in accordance with this disclosure. In the example of FIG. 2, architecture 200 is implemented in HEP system 100, though architecture 200 could be employed in any HEP system.

In the example of FIG. 2, architecture 200 includes an EEC 210 for controlling gas turbine engine 108. For example, EEC 210 may include a cascaded engine speed governing with dynamic limiter topping control architecture. EEC 210 may include engine nominal and protection control functions around a speed or torque governing loop.

Architecture 200 also includes an EPU 220 for controlling electric machine 110. EPU 220 may also include a cascaded control architecture, where the shaft speed governing of electric machine 110 is the outer loop and current control is the inner loop for torque regulation.

When thermal engine or electric powertrain supply aircraft power independently (e.g., no hybrid operation via any rigid mechanical connections (e.g., gearbox)), the above-mentioned control scheme is utilized. However, hybrid operation of both powertrain systems utilizes a Master-Slave control structure to collaborate the power/torque split strategy (i.e., via an algorithm 212)—where there is only one Master speed governing by EEC 210, and the Slave governing by EPU 220, which can be torque/current regulation. The control functions and sensor feedback are communicated via digital communication 214 between EEC 210 and EPU 220 (e.g., CAN BUS).

In the example of FIG. 2, where EEC 210 provides Master speed governing with torque limiter control and EPU 220 provides Slave torque/current governing during hybrid operation, EPU still utilizes a speed outer loop when the thermal engine is OFF (e.g., electric machine 110 is the only power/torque source) or for a zero or minimum electric machine total torque demand scenario (e.g., gas turbine engine 108 is the sole power/torque source and electric machine 110 is declutched from gearbox 106 (e.g., zero electric machine torque demand scenario), or clutched to gearbox 106 for speed synchronization (e.g., minimum electric machine torque demand scenario).

In the example of FIG. 2, algorithm 212 manages the torque demand requests and torque limits for gas turbine engine 108 and electric machine 110, with respect to inputs 116 such a power request, collective and pedal inputs for a turboshaft, ambient conditions, hybrid mode selection and battery state of charge status etc. Gas turbine engine 108 target torque is determined based on inputs 116 (e.g., aircraft power request, collective and pedal positions from a turboshaft at various altitude & propulsor speed setpoints [e.g., Rotor speed reference]), and constraints by gas turbine engine 108's own mechanical/thermal limits at a given engine core operating speed (e.g., inner gas generator speed with respect to propulsor speed governing and gas turbine torque limiter control). The residual of required aircraft power/torque to be provided by electric machine 110 (electrical powertrain torque demand) is calculated in algorithm 212, based on the difference of total torque required and the gas turbine engine demand/output up to the maximum engine mechanical and/or thermal limits of gas turbine engine 108.

In some embodiments, dynamic torque compensation demand for the electric machine is also included for automatic propulsor speed droop recovery control, with the additional consideration of electric machine 110 failures. In these embodiments, dynamic torque compensation demand is selected using a HEP speed sensor measurement. Dynamic torque compensation demand may be determined based on closed loop control on propulsor speed datum via a selected HEP speed sensor feedback (e.g., gas turbine engine power shaft speed, or electric engine shaft speed). In cases where electric machine 110 includes multiple electric motors, and there is a single electric motor failure, selection logic that is based on individual electric motor speed/torque sensor readings will allocate the required EPU torque demand to the available electric motors while limiting the total torque compensation demand to a level appropriate for the capability of the remaining electric motors.

Although FIG. 2 illustrates one example of a Master-Slave HEP engine control architecture 200, various changes may be made to FIG. 2. For example, while FIG. 2 illustrates an example where the EEC is master and the EPU is slave, the supervisory power/torque management control also can be performed by the EPU system. In these embodiments, the functional control structure is similar to what is described in FIG. 2, except that the EPU performs the Master speed governing and EEC performs the slave torque governing. For example, the EEC torque limiter control provides torque governing, while gas turbine engine speed governing is deactivated during hybrid operation.

FIG. 3 illustrates a flowchart for an example method 300 for a master-slave HEP control architecture with supervisory power management control in accordance with this disclosure. For example, method 300 may be performed by architecture 200 of FIG. 2. For ease of explanation, the method 300 shown in FIG. 3 may be described as being implemented or supported using a controller. However, the method 300 shown in FIG. 3 may be implemented or supported by any suitable device(s) and in any suitable system(s). For example, method 300 may be implemented in or supported by controller(s) 114 of FIG. 1.

In the example of FIG. 3, a controller such as controller(s) 114 of FIG. 1 operates an HEP, such as HEP 100 of FIG. 1 according to a master-slave HEP control architecture with supervisory power management control, such as architecture 200 of FIG. 2.

Method 300 begins at step 310. At step 310, the controller determines, based on a HEP power/torque demand and a maximum torque limit for a gas turbine engine, a target torque for the gas turbine engine. The gas turbine engine has a mechanical output coupled to a power shaft of the HEP. In some embodiments, method 300 further includes receiving at least one control input, and the HEP torque demand is determined based on the at least one control input.

At step 320, the controller controls the gas turbine engine to operate according to a target speed or the target torque. While the controller is controlling the gas turbine engine to operate according to the target speed or torque, at step 330 the controller determines, based on the HEP torque demand and the target torque, a total torque compensation demand for an electric machine. The total torque compensation demand for an electric machine may be determined as the sum of steady state torque compensation demand and dynamic torque compensation demand. The electric machine has a mechanical output controllably couplable to the power shaft of the HEP. In some embodiments, the steady state torque compensation demand is determined based on a difference between the HEP torque demand and a steady state torque demand of the gas turbine engine. In some embodiments, dynamic torque compensation demand (e.g., primary and backup) for the electric machine is determined based on closed loop control on propulsor speed datum via available HEP speed sensor feedback.

At step 340, the controller controls the electric machine according to the total torque compensation demand. In some embodiments, operating the electrical machine according to the total torque compensation demand includes controlling the mechanical output of the electric machine to couple to the power shaft of the HEP.

In some embodiments, the total torque compensation demand may be determined to be a minimum for a speed synchronization. In these embodiments, operating the electrical machine according to the minimum total torque compensation demand includes controlling the mechanical output of the electric machine to couple to the power shaft of the HEP but not supply a power boost.

In some embodiments, the total torque compensation demand may be determined to be none. In these embodiments, operating the electrical machine according to the total torque compensation demand may include based on the determination that the total torque compensation demand is none, controlling the mechanical output of the electric machine to decouple from the power shaft of the HEP.

In some embodiments, dynamic torque compensation demand for the electric machine is also included for automatic propulsor shaft speed droop recovery control, with additional consideration of electric machine failures. The dynamic torque compensation demand may be determined based on closed loop control on propulsor speed datum via available HEP speed sensor measurement. In these embodiments, when the HEP speed sensor measurement is available, the controller may operate the electric machine according to a sum of the steady state torque compensation demand and a dynamic torque compensation demand. The dynamic torque compensation demand may be determined based on the available HEP speed sensor measurement (e.g., gas turbine engine power shaft speed, or electric engine shaft speed). In embodiments that include multiple electric motors, and there is a single electric motor failure, selection logic that is based on individual electric motor speed/torque sensor readings may allocate the required EPU torque demand to the available electric motors while limiting the total torque compensation demand to a level appropriate for the capability of the remaining electric motors.

Although FIG. 3 illustrates one example of a method 300 for a master-slave HEP control architecture with supervisory power management control, various changes may be made to FIG. 3. For example, while shown as a series of steps, various steps in FIG. 3 could overlap, occur in parallel, occur in a different order, occur any number of times, be omitted, or be replaced by other steps.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of operating a hybrid electric powertrain, the method comprising:
    determining, based on a hybrid electric powertrain (HEP) power/torque demand and a maximum torque limit for a gas turbine engine having a mechanical output coupled to a power shaft of the HEP, a target torque for the gas turbine engine;
    controlling the gas turbine engine to operate according to a target speed or the target torque; and
    while operating the gas turbine engine according to the target speed or the target torque:
        determining, based on the HEP torque demand and the target torque, a total torque compensation demand for an electric machine having a mechanical output controllably couplable to the power shaft of the HEP; and
        operating the electric machine according to the total torque compensation demand,
    wherein the total torque compensation demand is determined as a sum of a steady state torque compensation demand and a dynamic torque compensation demand.

2. The method of claim 1, further comprising receiving at least one control input,
    wherein the HEP torque demand is determined based on the at least one control input.

3. The method of claim 1, wherein the steady state torque compensation demand is determined based on a difference between the HEP torque demand and a steady state torque demand of the gas turbine engine.

4. The method of claim 1, wherein the dynamic torque compensation demand is determined based on a closed loop control on a propulsor speed datum via an available HEP speed sensor measurement.

5. The method of claim 1, wherein operating the electrical machine according to the total torque compensation demand includes controlling the mechanical output of the electric machine to couple to the power shaft of the HEP and supply a power boost.

6. The method of claim 1, wherein:
    the total torque compensation demand is determined to be a minimum for a speed synchronization; and
    operating the electrical machine according to the total torque compensation demand includes, based on the determination that the total torque compensation demand is the minimum, controlling the mechanical output of the electric machine to couple to the power shaft of the HEP but not supply a power boost.

7. The method of claim 1, wherein:
    the total torque compensation demand is determined to be none; and
    operating the electrical machine according to the total torque compensation demand includes, based on the determination that the total torque compensation demand is none, controlling the mechanical output of the electric machine to decouple from the power shaft of the HEP.

8. The method of claim 1, wherein:
    the dynamic torque compensation demand is a closed loop control on a propulsor speed datum via an available HEP speed sensor measurement.

9. The method of claim 1, wherein:
    the electric machine comprises a plurality of electric motors; and operating the electric machine according to the total torque compensation demand includes:
  detecting a failure of at least one of the electric motors; and
  allocating the total torque compensation demand among the electric motors that have not failed while limiting the total torque compensation demand to a level appropriate for a capability of the electric motors that have not failed.

10. A controller configured to:
determine, based on a hybrid electric powertrain (HEP) torque demand and a maximum torque limit for a gas turbine engine having a mechanical output coupled to a power shaft of the HEP, a target torque for the gas turbine engine;
control the gas turbine engine to operate according to a target speed or the target torque; and
while operating the gas turbine engine according to the target speed or the target torque:
  determine, based on the HEP torque demand and the target torque, a total torque compensation demand for an electric machine having a mechanical output controllably couplable to the power shaft of the HEP; and
  operate the electric machine according to the total torque compensation demand,
wherein the total torque compensation demand is determined as a sum of a steady state torque compensation demand and a dynamic torque compensation demand.

11. The controller of claim 10, wherein the controller is further configured to:
receive at least one control input; and
determine the HEP torque demand based on the at least one control input.

12. The controller of claim 10, wherein the steady state torque compensation demand is determined based on a difference between the HEP torque demand and a steady state torque demand of the gas turbine engine.

13. The controller of claim 10, wherein operating the electrical machine according to the total torque compensation demand includes controlling the mechanical output of the electric machine to couple to the power shaft of the HEP and supply a power boost.

14. The controller of claim 10, wherein:
the total torque compensation demand is determined to be a minimum for a speed synchronization; and
operating the electrical machine according to the total torque compensation demand includes, based on the determination that the total torque compensation demand is the minimum, controlling the mechanical output of the electric machine to couple to the power shaft of the HEP but not supply a power boost.

15. The controller of claim 10, wherein:
the total torque compensation demand is determined to be none; and
operating the electrical machine according to the total torque compensation demand includes, based the determination that the total torque compensation demand is none, controlling the mechanical output of the electric machine to decouple from the power shaft of the HEP.

16. The controller of claim 10, wherein:
the dynamic torque compensation demand is a closed loop control on a propulsor speed datum via an available HEP speed sensor measurement.

17. The controller of claim 10, wherein:
the electric machine comprises a plurality of electric motors; and
to operate the electric machine according to the total torque compensation demand, the controller is further configured to:
  detect a failure of at least one of the electric motors; and
  allocate the total torque compensation demand among the electric motors that have not failed while limiting the total torque compensation demand to a level appropriate for a capability of the electric motors that have not failed.

18. A non-transitory machine readable medium containing instructions that when executed cause at least one processor to:
determine, based on a hybrid electric powertrain (HEP) torque demand and a maximum torque limit for a gas turbine engine having a mechanical output coupled to a power shaft of the HEP, a target torque for the gas turbine engine;
control the gas turbine engine to operate according to a target speed or the target torque; and
while operating the gas turbine engine according to the target speed or the target torque:
  determine, based on the HEP torque demand and the target torque, a total torque compensation demand for an electric machine having a mechanical output controllably couplable to the power shaft of the HEP; and
  operate the electric machine according to the total torque compensation demand,
wherein the total torque compensation demand is determined as a sum of a steady state torque compensation demand and a dynamic torque compensation demand.

19. The non-transitory machine readable medium of claim 18, wherein operating the electrical machine according to the total torque compensation demand includes controlling the mechanical output of the electric machine to couple to the power shaft of the HEP and supply a power boost.

20. The non-transitory machine readable medium of claim 18, wherein:
the electric machine comprises a plurality of electric motors; and
operating the electric machine according to the total torque compensation demand includes:
  detecting a failure of at least one of the electric motors; and
  allocating the total torque compensation demand among the electric motors that have not failed while limiting the total torque compensation demand to a level appropriate for a capability of the electric motors that have not failed.

\* \* \* \* \*